United States Patent
Kotaka et al.

(10) Patent No.: US 8,070,476 B2
(45) Date of Patent: Dec. 6, 2011

(54) THERMAL INSULATION STAMPER AND PRODUCTION METHOD OF SAME

(75) Inventors: Kazuhiro Kotaka, Yokohama (JP); Yuzuru Kudoh, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 302 days.

(21) Appl. No.: 12/209,857

(22) Filed: Sep. 12, 2008

(65) Prior Publication Data

US 2009/0074903 A1 Mar. 19, 2009

(30) Foreign Application Priority Data

Sep. 13, 2007 (JP) ................................ 2007-237805

(51) Int. Cl.
*B29D 17/00* (2006.01)
*G11B 7/26* (2006.01)
*C23C 16/50* (2006.01)

(52) U.S. Cl. ........ 425/470; 425/385; 425/810; 249/104; 249/116; 249/134; 264/220; 427/135

(58) Field of Classification Search .................. 425/385, 425/394, 470, 471, 810; 249/80, 102–104, 249/11, 114.1–116, 134–135; 264/1.33, 264/2.5, 106, 107, 219–222, 284, 328.1, 264/328.16; 427/133, 135, 575, 576; 428/457–459, 428/473.5, 542.2; 106/38.2, 38.22

See application file for complete search history.

(56) References Cited

U.S. PATENT DOCUMENTS

| | | | | |
|---|---|---|---|---|
| 4,565,772 A | * | 1/1986 | Takeoka et al. | 430/320 |
| 5,176,839 A | * | 1/1993 | Kim | 249/78 |
| 5,288,519 A | * | 2/1994 | Baumgartner et al. | 427/304 |
| 5,388,803 A | * | 2/1995 | Baumgartner et al. | 249/111 |
| 5,458,818 A | * | 10/1995 | Kim et al. | 264/1.33 |
| 6,146,558 A | * | 11/2000 | Feist et al. | 264/1.33 |
| 6,468,618 B1 | | 10/2002 | Murata et al. | |
| 6,787,071 B2 | | 9/2004 | Gorczyca et al. | |
| 7,687,007 B2 | * | 3/2010 | Ling et al. | 264/338 |
| 2004/0109915 A1 | * | 6/2004 | Murata et al. | 425/566 |
| 2006/0067203 A1 | | 3/2006 | Ito et al. | |
| 2006/0237303 A1 | * | 10/2006 | Hosoya et al. | 204/192.1 |
| 2007/0126136 A1 | | 6/2007 | Fujita et al. | |
| 2010/0220389 A1 | * | 9/2010 | Villuendas Yuste et al. | 359/360 |

FOREIGN PATENT DOCUMENTS

| | | | |
|---|---|---|---|
| CN | 1910676 A | | 2/2007 |
| JP | 2002083450 A | * | 3/2002 |
| JP | 2006120230 A | * | 5/2006 |
| JP | 2007176036 A | * | 7/2007 |
| WO | WO 2006043708 A1 | * | 4/2006 |

OTHER PUBLICATIONS

Translation of JP 2002-83450.*

* cited by examiner

*Primary Examiner* — Joseph Del Sole
*Assistant Examiner* — Dimple Bodawala
(74) *Attorney, Agent, or Firm* — Dickstein Shapiro LLP

(57) ABSTRACT

A thermal insulation stamper includes a first metal layer, a heat insulating layer, an intermediate layer, a conductive coating, and a second metal layer. The first metal layer has a fine pattern on an exposed surface. The heat insulating layer is formed of a heat-resistant resin and overlies the first metal layer. The heat-resistant resin contains oxygen. The intermediate layer overlies the heat insulating layer. The conductive coating overlies the intermediate metal layer. The second metal layer overlies the conductive coating. A region with a high concentration of oxygen is formed in the vicinity of an interface between the heat insulating layer and the intermediate layer. A method for producing such a thermal insulation stamper is also disclosed.

4 Claims, 9 Drawing Sheets

THERMAL INSULATION STAMPER AND PRODUCTION METHOD OF SAME

CROSS-REFERENCE TO RELATED APPLICATIONS

This application claims priority from Japanese Patent Application No. 2007-237805, filed on Sep. 13, 2007 in the Japanese Patent Office, the entire contents of which are incorporated by reference herein.

FIELD OF THE INVENTION

The present invention relates to a thermal insulation stamper and a method for producing the same, and more particularly, to a stamper having a durable laminated structure with a heat insulating layer suitable for use in injection molding of an optical disk substrate, and a method for producing such a thermal insulation stamper.

BACKGROUND OF THE INVENTION

Stampers are used in injection molding machines to produce substrates for optical disks. One specific type of optical disk stamper is a thermal insulation stamper, which has a laminated structure with a heat-insulating layer to enhance thermal efficiency in injection molding. The heat insulating capability of such a thermal insulation stamper allows high quality and volume production of optical disks.

Figure 1A:
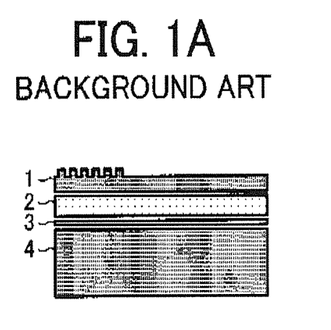
FIGS. 1A and 1B are cross-sectional views illustrating a laminated structure of a typical thermal insulation stamper.

FIG. 1A is a cross-sectional view illustrating a laminated structure of a typical thermal insulation stamper.

As shown in FIG. 1A, the laminated stamper includes a first metal layer 1, a heat insulating layer 2, a conductive coating 3, and a second metal layer 4. The first metal layer 1 has a finely patterned surface encoding data to be transferred to the optical disk substrate. The first and second metal layers 1 and 4 and the conductive coating layer 3 are formed of nickel and the heat-insulating layer 102 is formed of polymer.

The laminated structure is provided through initial formation of the first metal layer 1 on a master plate, followed by successive depositions of the heat-insulating layer 2, the conductive coating 3, and the second metal layer 4. The conductive coating 3 is formed by sputtering or the like, and acts as a cathode in obtaining the second metal layer 104 through electroformation.

Such a laminated structure is required to have sufficient durability since a stamper is subjected to harsh environmental conditions during injection molding of optical disk substrates.

Figure 2:
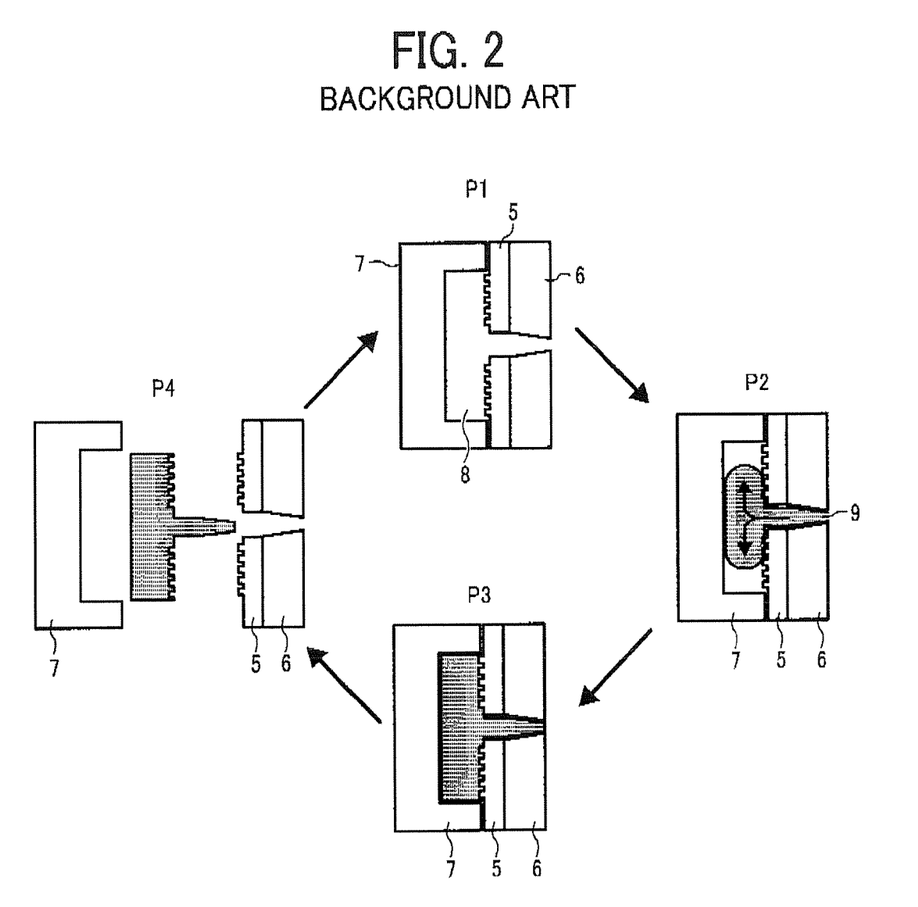
FIG. 2 illustrates an example of optical disk manufacturing in a typical injection molding machine.

FIG. 2 illustrates an example of optical disk manufacturing using a typical injection molding machine.

As shown in FIG. 2, the injection molding machine is formed of a stamper 5 and a mold consisting of two sides or plates 6 and 7, one movable and the other fixed. An optical disk substrate is produced through a manufacturing cycle involving the following processes.

Initially, the mold assembly is heated to a control temperature of approximately 100° C. and the mold plates 6 and 7 are clamped together to define an interior mold cavity 8 (process P1).

Then, molten plastic of approximately 300° C. is injected into the mold cavity 8 (process P2).

Subsequently, the mold cavity 8 is cooled to the control temperature of 100° C. so as to solidify the injected plastic (process P3).

After cooling and solidification, the mold plates 6 and 7 are separated to allow the resulting substrate to be removed from the mold cavity 8 (process P4).

In the manufacture of optical disk substrates, such a manufacturing cycle, completing within 10 seconds or less, is repeated a number of times. This means that the stamper installed in the injection mold is subjected to cyclic thermal stress, i.e., rapidly changing temperatures of between 100° C. to 300° C. in each manufacturing cycle. Moreover, the stamper also sustains cyclic mechanical stress due to injection pressure, that is, the injection of material exerting a pressure of 50 Mpa.

With reference to FIG. 1A, as mentioned, the thermal insulation stamper includes the heat insulating layer 2 which is typically formed of polymer. Although the polymer insulator has several advantages, such as high insulation capability with reduced thickness, ease of handling, and reduced manufacturing cost, the thermal insulation stamper having such a polymer insulator is vulnerable to delamination when subjected to thermal cycling in the injection molding.

Figure 1B:
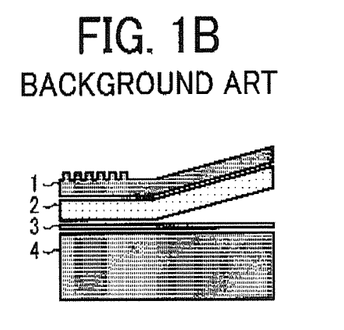

FIG. 1B illustrates the typical thermal insulation stamper, delaminating under thermal stress after repeated injection molding cycles.

As shown in FIG. 13, the thermally-induced delamination typically occurs at an interface between the polymer layer 2 and the underlying nickel layer 3 in the laminated structure. Taking into account the fact that polymeric material has a coefficient of thermal expansion roughly ten times greater than that of metal, one major factor causing such interfacial delamination is shear stress caused by the difference in thermal expansion between the polymer layer 2 and the nickel layer 3.

It is known that the delamination causes minute deformation of the patterned surface of the stamper. Naturally, the deformation in the mold pattern results in deformation of the molded substrate and the data pattern of the resulting optical disk substrate. According to a recent assessment, optical disks manufactured with a stamper undergoing a number of manufacturing cycles (i.e., over 100,000 shots) suffered degradation of the data pattern at their inner or outer perimeters, while such defects were not observed with a stamper used in production of smaller lot sizes (i.e., 50,000 shots or below).

Thus, it is advantageous to have a durable thermal insulation stamper having a laminated structure with a heat insulating layer that can withstand the harsh environmental conditions encountered in the injection molding of optical disk substrates.

SUMMARY OF THE INVENTION

This patent specification describes a novel thermal insulation stamper.

In one embodiment, the novel thermal insulation stamper includes a first metal layer, a heat insulating layer, an intermediate layer, a conductive coating, and a second metal layer. The first metal layer has a fine pattern on an exposed surface. The heat insulating layer is formed of a heat-resistant resin and overlies the first metal layer. The heat-resistant resin contains oxygen. The intermediate metal layer overlies the heat insulating layer. The conductive coating overlies the intermediate layer. The second metal layer overlies the conductive coating. A region with a high concentration of oxygen is formed in the vicinity of an interface between the heat insulating layer and the intermediate layer.

This patent specification also describes a novel method for producing a thermal insulation stamper.

In one embodiment, the novel production method includes master plate provision, first metal layer formation, heat insulating layer formation, intermediate layer formation, conductive layer formation, second metal layer formation, and master plate separation. The master plate provision provides a master plate having a finely patterned surface. The first metal layer formation forms a first metal layer on the patterned surface of the master plate. The heat insulating layer formation forms a heat insulating layer with a heat-resistant resin over the first metal layer. The heat-resistant resin contains oxygen. The intermediate layer formation forms an intermediate layer with a metal over the heat insulating layer. The conductive coating formation forms a conductive coating over the intermediate layer. The second metal layer formation forms a second metal layer over the conductive coating. The master plate separation separates the master plate from the first metal layer. The intermediate layer and the conductive coating are successively vapor-deposited using plasma treatment without exposure to air. The plasma treatment forms a region with a high concentration of oxygen in the vicinity of an interface between the heat insulating layer and the intermediate layer.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, example embodiments of this patent specification are described.

This patent specification is directed to a thermal insulation stamper having a durable laminated structure with a heat insulating layer, and to a method for producing such a durable thermal insulation stamper. In order to facilitate an understanding of the stamper according to this patent specification, a description is first given of studies carried out to investigate a laminated structure of a conventional thermal insulation stamper and to distinguish features of the stamper structure according to this patent specification.

Figure 3:
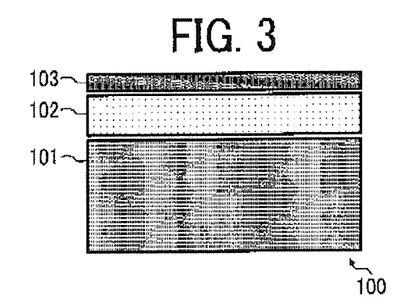
FIG. 3 shows a laminate sample prepared to study a laminated structure typical of conventional thermal insulation stampers.

FIG. 3 shows a laminate sample 100 prepared to study a laminated structure typical of conventional thermal insulation stampers.

As shown in FIG. 3, the sample 100 is formed of a nickel substrate 101, a polymer layer 102 overlying the substrate 101, and a nickel thin film 103 deposited on the polymer layer 102.

In an actual thermal insulation stamper, the nickel substrate 101 forms an outermost metal layer with a patterned surface, the polymer layer 102 forms a heat insulating layer, and the nickel thin film 103 serves as a conductive coating through which a subsequent metal layer is electroformed over the underlying layer.

The sample 100 was prepared using known thin-film deposition techniques, involving initial formation of the substrate 101 and subsequent deposition of the polymer layer 102 thereon, followed by deposition or sputtering of the nickel thin film 103 on the polymer layer 102. The material used to obtain the polymer layer 102 was a polyamideimide (PAI) sold under the trade name VYLOMAX® by TOYOBO Co., Ltd., a chemical structure of which is generally represented by the following formula:

where "Ar" is arylene and "n" is a natural number.

Figure 4A:
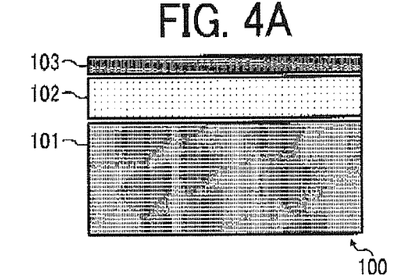
FIGS. 4A-4C illustrate steps in a process of X-ray photoelectron spectroscopy (XPS) depth profiling.
Figure 4B:
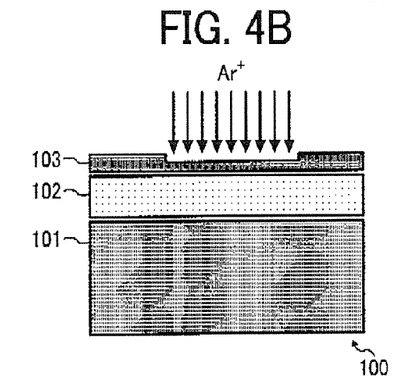
Figure 4C:
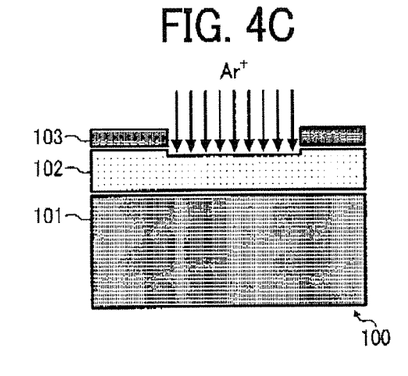

The laminate sample 100 was subjected to X-ray photoelectron spectroscopy (XPS) analysis to measure depth profile of elemental composition. FIGS. 4A-4C illustrates the procedure of XPS depth profiling.

As shown in FIGS. 4A-4C, the XPS analysis involved a sequence of argon ion etching cycles starting from the nickel thin film 103 down to the PAI layer 102, each removing material with a fixed etching power to expose a new surface of the sample 100. After each etching cycle, an XPS analysis was performed to determine the elemental composition of the current surface of the sample 100. Elements detected in the XPS analysis for the sample 100 included nickel (Ni) constituting the thin film 103, as well as carbon (C), oxygen (O), and nitrogen (N) contained in the PAI layer 102, in descending order of proportion by weight.

Figure 5:
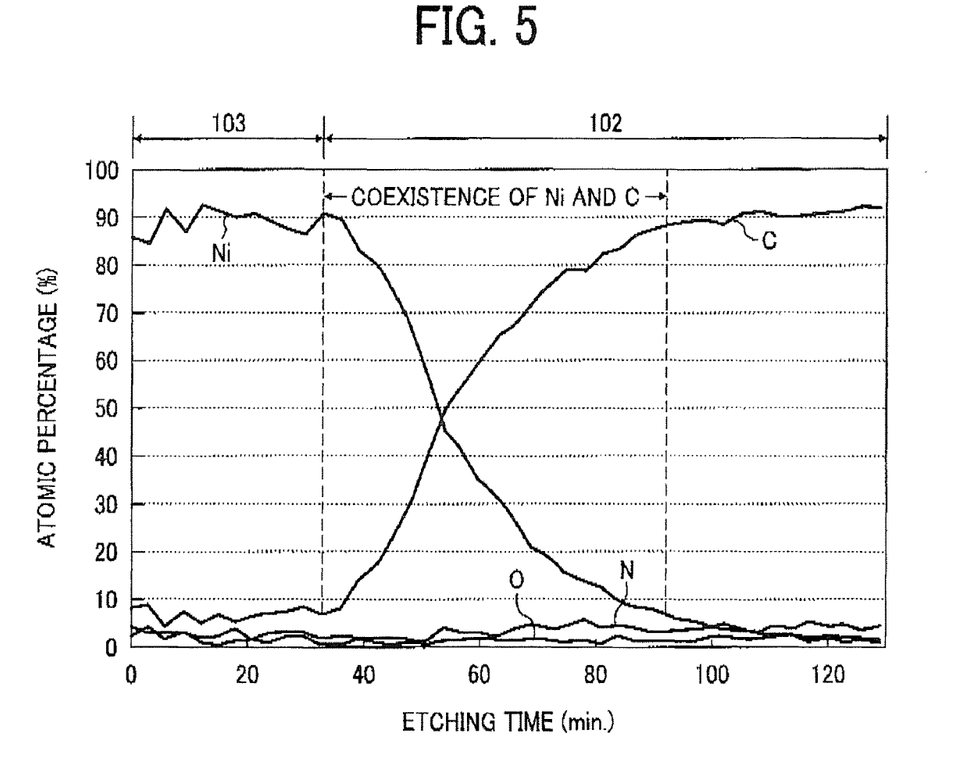
FIG. 5 is a plot showing XPS measurements of the sample of FIG. 3.

FIG. 5 is a plot showing the XPS measurements of the sample 100.

In FIG. 5, and in other XPS depth profiles presented in this patent specification, the horizontal axis represents etching time, and the vertical axis represents elemental composition in atomic percent of the sample examined. Since the etching power exerted on the sample surface was fixed throughout the experiment, the etching time in minutes is deemed to be substantially equivalent to the depth in μm from the original top surface of the sample.

As shown in FIG. 5, an initial increase in the proportion of carbon atoms, the major constituent of PAI, defines an upper boundary of the PAI layer 102 or an interface between the PAI 102 layer and the nickel thin film 103. Assuming that the interface between the PAI layer 102 and the nickel thin film 103 is marked by an etching time of nearly 40 minutes, a certain amount of nickel atoms are observed to diffuse across the PAI/Ni interface to coexist with carbon atoms in the PAI layer 102.

Such coexistence of nickel and carbon indicates presence of an anchoring effect, where the diffused nickel atoms are anchored to PAI to provide bonding between the PAI layer 102 and the nickel thin film 103.

In general, a thermal insulation stamper is vulnerable to delamination that propagates from edges of the laminate structure to cause deformation of data patterns in the corresponding regions of optical disks manufactured therewith. Such delamination is known to occur at an interface between polymer and metal, because the two layers have a smooth surface due to the manufacturing process, which results in reduced interfacial contact and weaker bonding at the metal/polymer interface. Another factor reducing the strength of interfacial bonding is different physical properties of the organic layer and the inorganic layer. It seems that the anchoring effect as observed in the laminated structure 100 of a conventional thermal insulation stamper is too weak to hold the polymer layer to the metal layer.

While different approaches may be considered to prevent delamination of the thermal insulation stamper, such as amplifying the anchoring effect in the metal/polymer interface or providing an additional bonding mechanism to enhance adhesion of the polymer layer to the metal layer, the thermal insulation stamper according to this patent specification achieves high durability against delamination by providing an intermediate layer between a metal layer and a polymer insulating layer.

Specifically, the stamper structure according to this patent specification includes a heat insulating layer formed of oxygen-containing polymer and an intermediate layer formed of oxygen-active metal and deposited on the polymer insulating layer using plasma vapor deposition technique. The plasma used to deposit the intermediate metal layer chemically activates the surface of the polymer layer so that the oxygen-active metal generates a chemical bond with oxygen, so that the two layers are bonded together through the chemical bonding that takes place between the oxygen and metal atoms, resulting in excellent bonding strength at the metal/polymer interface.

Considering that a thermal insulation stamper is typically used in harsh thermal cycling, preferred examples of the oxygen-containing polymer include polyimides, polyamide-imides, and epoxy resins. Examples of the oxygen-active metal include chromium and titanium.

Further studies were conducted to investigate efficacy and features of the laminated structure of the thermal insulation stamper according to this patent specification.

Figure 6:
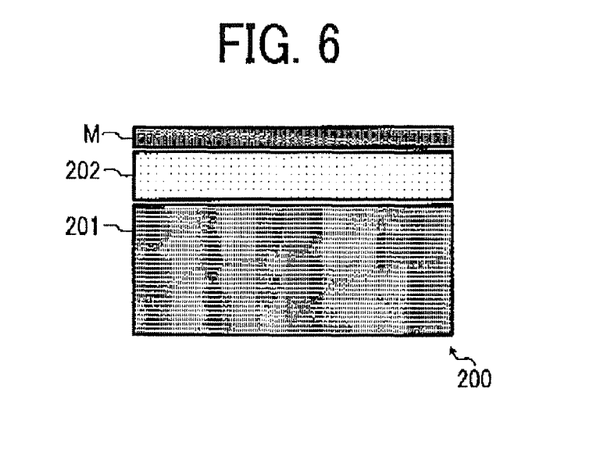
FIG. 6 shows a laminate sample prepared to study a bonding mechanism between an intermediate layer and a polymer layer of a thermal insulation stamper according to this patent specification.

FIG. 6 shows a laminate sample 200 prepared to study the bonding mechanism between the intermediate layer and the polymer layer according to this patent specification.

As shown in FIG. 6, the sample 200 includes a nickel substrate 201, a polymer layer 202 overlying the substrate 201, and a chromium thin film M deposited on the polymer layer 202.

In the actual stamper structure, the nickel substrate 201 is a metal layer having a patterned surface for injection molding, the polymer layer 202 is a heat insulating layer, and the chromium thin film M serves as the intermediate layer that combines the heat insulating layer with a subsequent metal layer, not shown.

The sample 200 was prepared using procedures and materials similar to those used to obtain the sample 100, except that the surface of the polymer layer 202 is chemically activated through plasma treatment prior to vapor deposition of the chromium thin film M using an ion plating machine, as will be described later with reference to FIG. 10.

The laminate sample 200 was subjected to XPS depth profiling in a manner similar to that depicted in FIG. 4, except that the elements detected were chromium (Cr), carbon (C), oxygen (O), and nitrogen (N).

Figure 7:
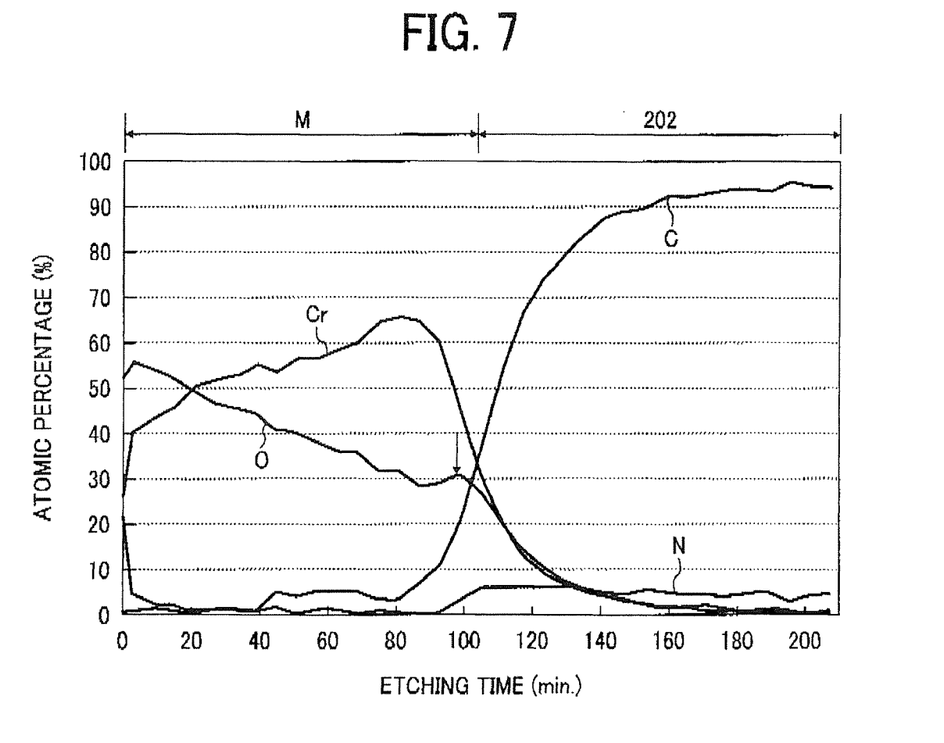
FIG. 7 is a plot showing XPS measurements of the sample of FIG. 6.

FIG. 7 is a plot showing the XPS measurements of the sample 200. While the XPS data may be analyzed under the assumption made above with reference to FIG. 5, the scale and range of the etching time axis are different between FIG. 5 and FIG. 7. Such a difference stems from the fact that, with the same etch power employed, the depth reached in a given period of time is greater for a nickel layer than for a chromium layer, that is, the etching time required to remove a given amount of material is shorter in a nickel layer than in a chromium layer.

As shown in FIG. 7, an initial increase in the proportion of carbon at an etching time of nearly 100 minutes marks an interface between the PAI layer 202 and the chromium thin film M.

It is to be noted that, in contrast to the sample 100, the sample 200 contains a significant amount of oxygen. The concentration of oxygen is high in the chromium thin film M and tends to decrease at a substantially constant rate as the etching depth increases from the top surface into the bulk of the material with the etching time increasing from 0 to 200 minutes. Such data indicates that the chromium surface of the sample 200 was oxidized upon exposure to air after removal from a deposition chamber in which the chromium thin film M was deposited.

It is also to be noted that the oxygen concentration shows a transient rise (indicated by an arrow) in the vicinity of the Cr/PAI interface, or more specifically, between the Cr/PAI interface and an area where the chromium concentration reaches maximum. While the decrease in the oxygen concentration is clearly consistent with the oxidation proceeding from the sample surface, the transient rise indicates that a different chemical reaction involving oxygen is developed in the vicinity of the Cr/PAI interface.

Analysis of the chromium thin film M revealed the presence of a chemical compound consisting of chromium and organic material in the vicinity of the Cr/PAI interface. This chemical compound, although its exact structure and composition have not been determined, is supposed to be a product of the oxygen-involving reaction indicated by the transient rise in oxygen concentration in the depth profile of the sample 200. Thus, it is reasonable to conclude that chromium reacts with organic material, i.e., PAI, through the medium of oxygen to form the chemical compound in the vicinity of the Cr/PAI interface of the laminated structure.

Figure 8:
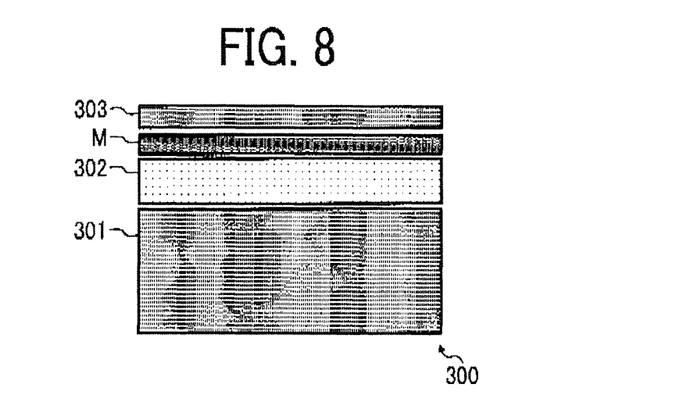
FIG. 8 shows a laminate sample prepared to study a chemical reaction occurring within the thermal insulation stamper according to this patent specification.

FIG. 8 shows a laminate sample 300 prepared to study the oxygen-mediated reaction in the vicinity of the Cr/PAI interface of the laminated structure according to this patent specification.

As shown in FIG. 8, the sample 300 includes a nickel substrate 301, a polymer layer 302 overlying the substrate 301, a chromium thin film M deposited on the polymer layer 302, and a nickel thin film 303 superimposed on the chromium thin film MM. The nickel thin film 303 shields the upper surface of the chromium thin film M from air.

In the actual stamper structure, the nickel substrate 301 is a metal layer having a patterned surface for injection molding, the polymer layer 302 is a heat insulating layer, the chromium thin film M serves as the intermediate layer that combines the heat insulating layer with a subsequent metal layer, and the nickel thin film 303 serves as a conductive coating through which a subsequent metal layer is electroformed over the underlying layer.

The sample 300 was prepared using procedures and materials similar to those used to obtain the sample 200, except that depositions of the chromium thin film M and the nickel thin film 303 were performed in succession in the vapor deposition chamber without exposing the workpiece to air.

The laminate sample 300 was subjected to XPS depth profiling in a manner similar to that depicted in FIG. 4, except that the elements detected were chromium (Cr), nickel (Ni), carbon (C), and oxygen (O).

Figure 9:
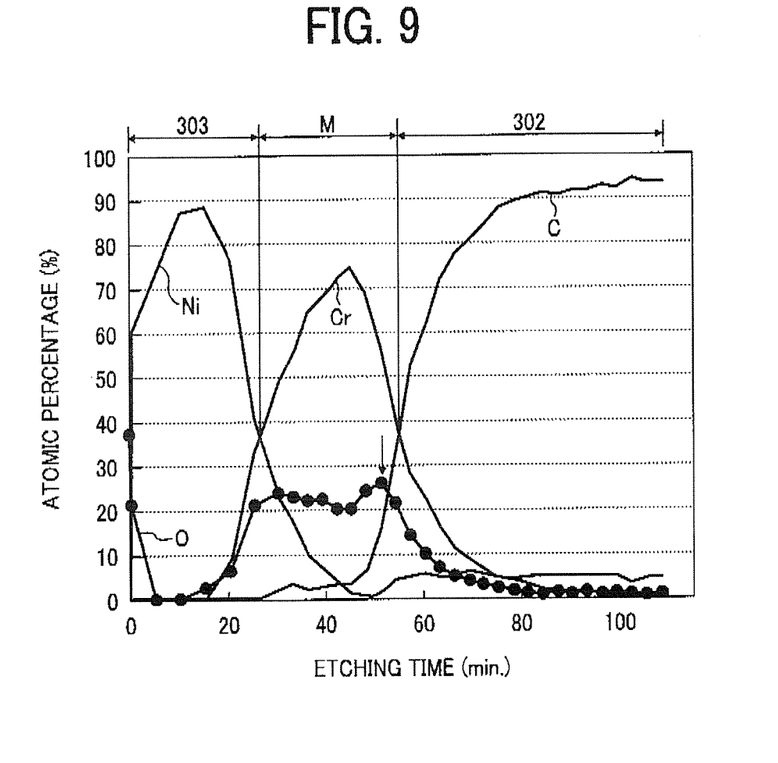
FIG. 9 is a plot showing XPS measurements of the sample of FIG. 8.

FIG. 9 is a plot showing the XPS measurements of the sample 300.

As shown in FIG. 9, an initial increase in the carbon proportion at the etching time of nearly 50 minutes marks an interface between the PAI layer 302 and the chromium thin film M. Specifically, this graph assumes that the interface between the PAI layer 302 and the chromium thin film M is situated where the major constituents of the two layers, i.e., carbon and chromium, have an identical concentration.

It is to be noted that the oxygen concentration initially declines to 0 at. % in the nickel thin film 303, and starts to increase as the chromium concentration increases in the chromium thin film M. Such data indicates that oxygen atoms supplied from the atmosphere could not penetrate into the chromium thin film M, and that the chromium thin film M derives oxygen atoms from a source other than the atmosphere. Taking into account the fact that the chromium and nickel depositions were performed without removing the workpiece from the deposition chamber, and that the only oxygen-containing substance existed in the deposition chamber was PAI, it is clear that the oxygen content present in the chromium thin film M originated in the PAI layer 302.

Also to be noted is that the oxygen concentration in the sample 300 shows a transient rise (indicated by arrow) in the vicinity of the Cr/PAI interface, or more specifically, between the Cr/PAI interface and an area where the chromium concentration reaches maximum, indicating the presence of an oxygen-involving reaction as in the case of the sample 200. Further analysis revealed the presence of a chemical compound of chromium and organic material in the vicinity of the Cr/PAI interface, which is supposed to be a product of the oxygen-involving reaction indicated by the transient rise in oxygen concentration in the depth profile of the sample 300.

Consequently, it can be deduced that the reaction between chromium and PAI in the vicinity of the Cr/PAI interface of the laminated structure occurs through the medium of oxygen originating in the PAI layer, even when the chromium surface is shielded and oxygen does not penetrate into the chromium thin film.

Figure 10A:
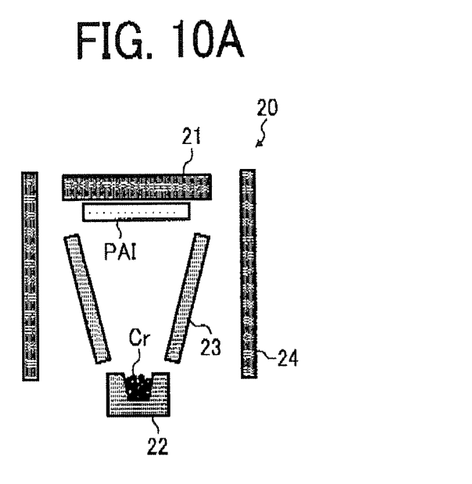
FIGS. 10A and 10B schematically illustrate an ion plating machine used to obtain the intermediate layer according to this patent specification.
Figure 10B:
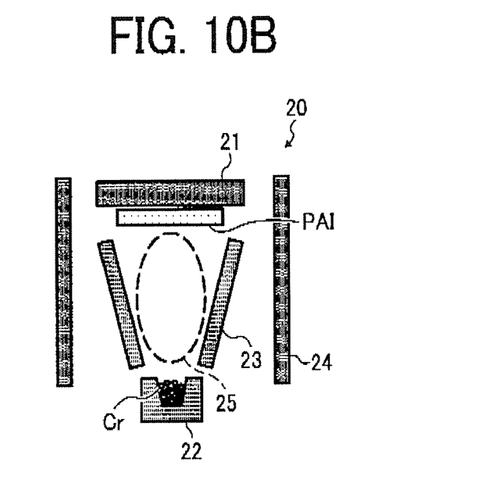

FIGS. 10A and 10B schematically illustrate an ion plating machine 20 used to obtain the metal thin film or intermediate layer M according to this patent specification.

As shown in FIG. 10A, the ion plating machine 20 includes a substrate holder 21 as well as a target holder 22 and a shield 23 made of copper, all of which are enclosed in a deposition chamber 24. In the deposition chamber 24, the substrate to be coated is held on the substrate holder 21 and the material to be deposited is provided in the target holder 22. The principle of ion plating is well known and therefore is not described in detail herein.

As shown in FIG. 10B, in the formation of the intermediate layer M, the ion plating machine 20 generates a plasma to decompose molecules on the surface of the PAI layer into carbon, oxygen, nitrogen, and other constituent elements. The reaction between chromium and PAI is supposed to occur when ionized chromium particles, which are highly reactive to oxygen, reach the surface of PAI layer where some oxygen atoms originating from PAI remain in an activated state.

As mentioned, the exact structure and composition of the chemical compound resulting from the reaction between Cr and PAI are not determined. Moreover, the location of the chemical compound in the laminated structure, expressed in the phrase "in the vicinity of the metal/polymer interface", is not precisely identifiable due to decomposition and diffusion of particles across the metal/polymer interface involved in the plasma vapor deposition of the intermediate layer M, although the depth profiling shown in FIGS. 7 and 9 demonstrate the presence of this chemical compound.

However, the fact that the constituents of the metal layer and the polymer layer are chemically bonded within the laminated structure indicates that the provision of the intermediate layer M causes durable bonding at the metal/polymer interface in the thermal insulation stamper according to this patent specification.

Tests, described below, were conducted using the laminate samples 100 and 300 to evaluate the durability of the metal/polymer interface of the laminated stamper structure according to this patent specification in comparison with that of the conventional laminated stamper structure.

1. Bonding Strength at Metal/Polymer Interface

Figure 11:
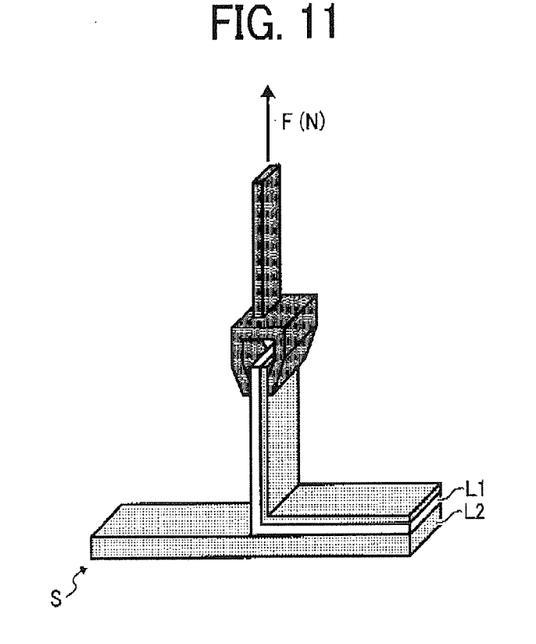
FIG. 11 illustrates a 90-degree peel test conducted to evaluate bonding strength of the stamper structure according to this patent specification.

FIG. 11 illustrates a 90 degree peel test conducted to measure the bonding strength at the metal/polymer interface of the laminated structure.

As shown in FIG. 11, first, a 1-cm wide strip (S) was cut in the laminated structure. The PAI layer (L1) was partially separated from the metal layer (L2) using a cutter, and bent perpendicular to the substrate. The substrate was then fixed on a stage, and the free end of the PAI layer was clipped and pulled in the direction of arrow. Interfacial bonding strength was measured as a pulling force F required to peel away the PAI layer from the metal layer.

The sample 100 exhibited a bonding strength of 25 N/cm. By contrast, the bonding strength of the sample 300 was not available from the above test procedure, since the PAI layer was bonded to the chromium layer too tightly to initiate rupture at the metal/polymer interface.

2. Durability in Thermal Cycling

Figure 12A:
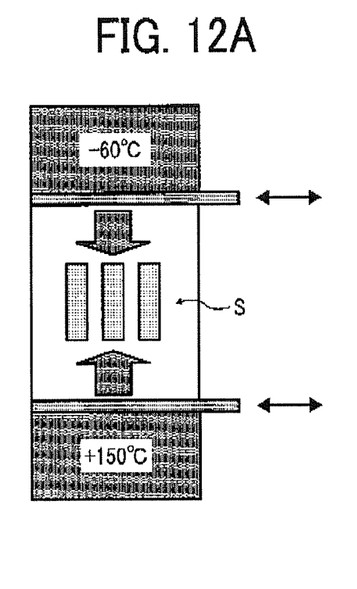
FIGS. 12A and 12B schematically illustrate an air-to-air thermal shock test conducted to evaluate durability of the stamper structure according to this patent specification.
Figure 12B:
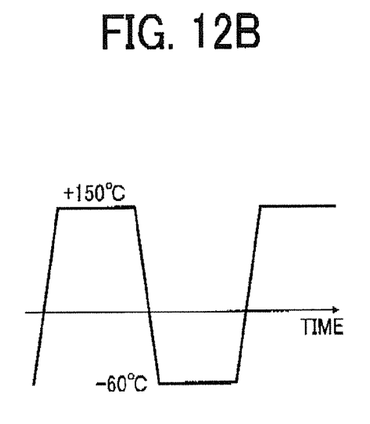

FIGS. 12A and 12B schematically illustrate an air-to-air thermal shock test conducted to determine durability of the laminated structure in thermal cycling.

As shown in FIGS. 12A and 12B, the test sample (S) was alternately moved between a cold environment of −60° C. and a hot environment of +150° C., simulating conditions under which a stamper is employed in an injection mold machine.

Such thermal cycling was repeated, after which the sample was subjected to the 90-degree peel test described above to measure the bonding strength of the polymer layer.

Table 1 below provides results of the tests.

TABLE 1

| Number of heat shocks | Bonding strength (N/cm) | |
|---|---|---|
| | Sample 100 | Sample 300 |
| 0 | 25 | NM |
| 1 | 2.0 | NM |
| 2 | 1.5 | NM |
| 800 | 0 | NM |

Note:
"NM" indicates measurement was not available due to the difficulty in separating the PAI layer from the metal layer.

As shown in Table 1, the interfacial bonding strength of the sample 100 declines sharply to less than 1/10 its initial value after the first thermal cycle. Moreover, after 800 cycles of the thermal shock test, the metal/polymer interface of the sample 100 was completely broken so that it was no longer possible to continue the test. By contrast, the metal/polymer interface of the sample 300 exhibited excellent bonding so that it was impossible to separate the PAI layer from the chromium layer even after undergoing 800 thermal cycles.

The test results demonstrate excellent bonding at the metal/polymer interface and significant durability of the laminated structure of the thermal insulation stamper according to this patent specification.

Referring to FIGS. 13A through 13F, production of the thermal insulation stamper structure according to this patent specification is described, applied to fabrication of a stamper for injection molding of optical disk substrates.

1. Master Plate Patterning

Figure 13A:
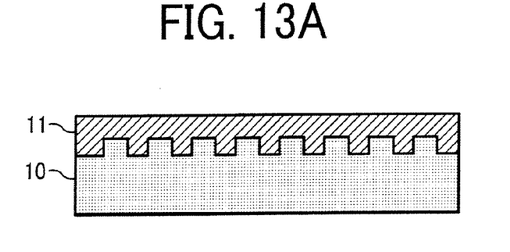
FIGS. 13A through 13F schematically illustrate production of the thermal insulation stamper according to this patent specification.

First, a master plate 10 having a finely patterned surface is prepared. The fine pattern is either a spiral or concentric groove, which is used for tracking, recording, and/or reproducing data in an optical disk product.

In the preparation process, a layer of photoresist is deposited (e.g., by spin coating) on a clean substrate made of glass, metal, or silicon. The photoresist layer is then selectively removed through exposure to a laser beam modulated according to a data pattern to be drawn. The data pattern is developed by a suitable process to obtain the finely patterned master plate 10.

2. Conductive Coating Deposition

The patterned surface of the master plate 10 is then coated with a conductive material.

The coating process is performed using a suitable deposition technique, such as sputtering, vacuum evaporation, electroless plating, or the like. Preferably, the conductive coating is formed of nickel, which allows for high-speed electroforming and therefore is used to form metal layers in the subsequent processes.

The thickness of the conductive coating may be in the range of approximately 50 to approximately 200 nm, since a too-thin coating can lead to formation of defective pits and other failures while a too-thick coating results in cracks under high internal stress.

3. Formation of First Metal Layer

The surface of the master plate 10 thus coated with a conductive material is then electroplated to obtain a first metal layer 11 as shown in FIG. 13A.

In electroforming the first metal layer 11, the master plate 10 is immersed in a nickel electrolytic bath through which an electric current is passed at a low density of less than 0.2 A/dm$^2$ for from 3 to 5 minutes. This preparatory treatment enhances wettability of the conductive coating with respect to the nickel electrolyte so as to prevent formation of defective pits and delamination during the electroplating process.

Thereafter, the current density is raised to a given final level in the range of approximately 12 to approximately 20 A/dm$^2$, and maintained at this level to obtain the nickel layer 11 with a given thickness, e.g., 30 μm or so.

Preferably, the electroforming bath is a nickel sulfamate solution with no brightener added. This provides an appropriate roughness to the surface of the resulting nickel layer 11 (e.g., with a roughness average value ranging from approximately 0.5 μm to approximately 3 μm), leading to enhanced anchoring and adhesion of the nickel layer 11 to an adjacent layer superimposed thereon in the following process.

4. Formation of Insulating Layer

Figure 13B:
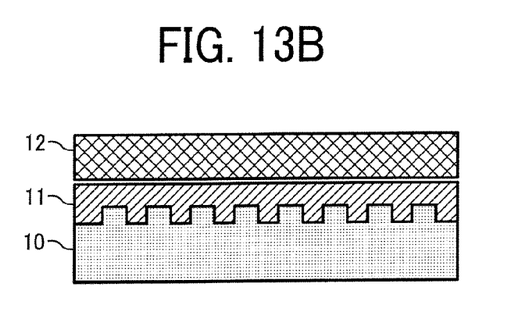

Next, a heat insulating layer 12 is formed on the first metal layer 11 as shown in FIG. 13B.

In forming the heat insulating layer 12, a varnish of heat-resistant resin containing oxygen is deposited on the first metal layer 11 and spread to a desired thickness by spin coating. The resin varnish is prepared by dissolving the heat-resistant resin in a suitable solvent such as N-methyl-pyrrolidone (NMP).

The heat-resistant resin to be used in this process has a thermal conductivity lower than that of nickel, including polyimide, PAI, and epoxy resins, among which PAI is preferred since it possesses higher levels of heat resistance and thermal contraction required to provide desirable insulation for stampers.

The varnished surface is then heated in an oven at a temperature ranging from approximately 75° to approximately 95° C. for a duration ranging from approximately 30 to approximately 60 minutes to vaporize the solvent. After heating, the workpiece is dried to obtain the heat insulating layer 12 with 2 thickness ranging from approximately 15 to approximately 150 μm.

5. Formation of Intermediate Metal Layer

Figure 13C:
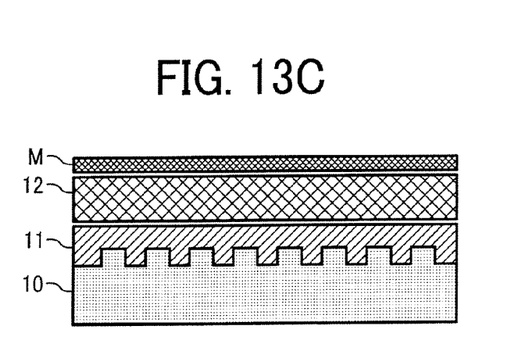

After the heat insulating layer 12 is provided, an intermediate metal layer M is formed on the polymer surface as shown in FIG. 13C.

In forming the intermediate layer 12, a metal with high reactivity with oxygen such as chromium and titanium is deposited by an appropriate vapor deposition technique using plasma treatment.

Examples of such a deposition technique include sputter deposition, ion plating, and other vacuum deposition processes using argon gas, among which sputtering and ion plating are preferred when it is desired to oxidize the metal deposited and drive metal particles deeper into the heat insulating layer 12 for obtaining good bonding at the metal/polymer interface.

The vapor deposition may be performed under the following conditions: Ultimate vacuum ranging from approximately 2*10$^{-5}$ to approximately 8*10$^{-5}$ Pa; argon leak pressure ranging from $3*10^2$ to approximately $7*10^2$ Pa; and radio frequency (RF) power ranging from approximately 70 to approximately 100 W.

The thickness of the intermediate metal layer M may be in the range of approximately 20 to approximately 100 nm, since a metal film thinner than such range is difficult to form, whereas a thicker metal film would crack under internal stress.

6. Formation of Conductive Coating

Figure 13D:
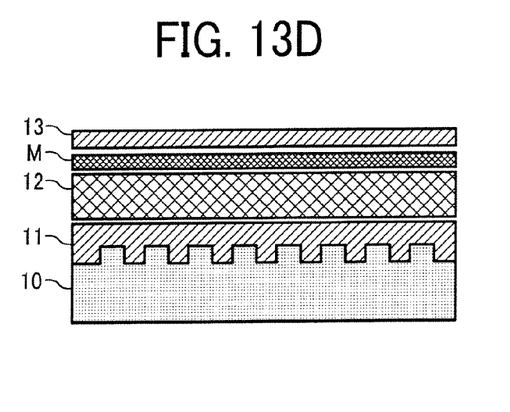

After the intermediate metal layer M is obtained, a conductive coating 13 is formed on the intermediate metal layer M as shown in FIG. 13D.

The conductive coating 13 is formed in a vacuum using the vapor deposition process and conditions used to form the intermediate layer M. The conductive coating 13 may be formed of nickel, which is used in the subsequent process to obtain a metal layer, and may have a thickness ranging from approximately 40 to approximately 200 nm.

That is, depositions of the conductive coating 13 and the intermediate metal layer M are performed in succession without exposing the workpiece to air. Such successive depositions of the adjacent layers maintains an active state of the material of the intermediate metal layer M, i.e., chromium or titanium, so that the metal can react with the conductive material to form an intermetallic compound, which provides extremely strong bonding between the intermediate metal layer M and the conductive coating 13.

7. Formation of Second Metal Layer

Figure 13E:
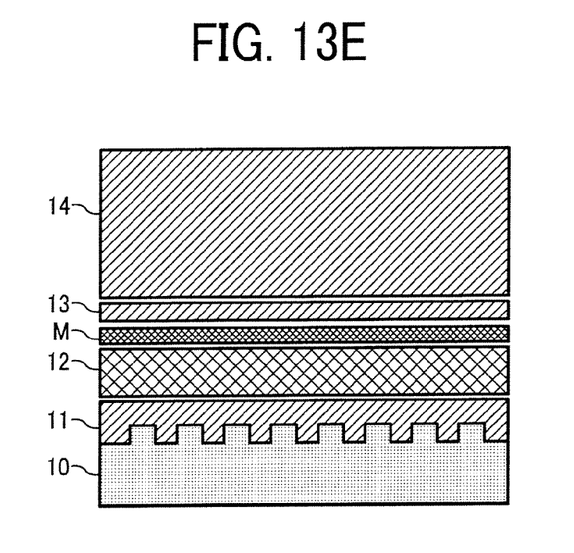

Subsequently, a second metal layer 14 is deposited on the conductive coating 13 as shown in FIG. 13E.

The second metal layer 14 is formed through a nickel electroforming process similar to that used to obtain the first metal layer 10. After formation of the second metal layer 14, the multilayered structure has a total thickness of approximately 300 μm.

8. Separation of Master Plate

Figure 13F:
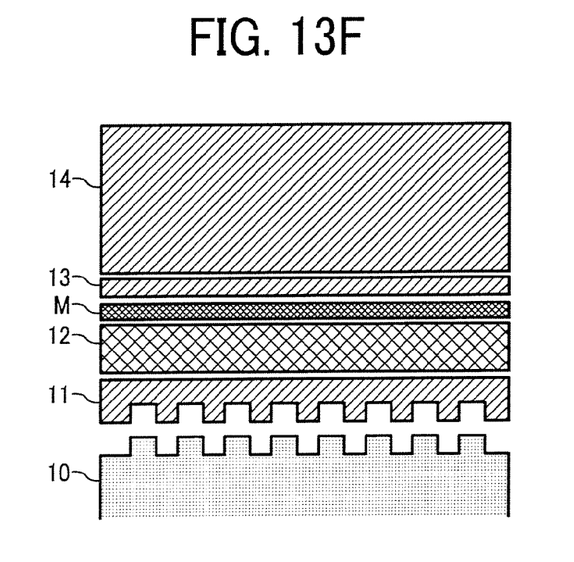

Thereafter, the workpiece is separated from the master plate 10 as shown in FIG. 13F.

This process should be performed with care so as to avoid extra stress and deformation of the multilayered structure. After separation, the surface of the first metal layer 11, to which the fine pattern is transferred from the master plate, is treated with an ultraviolet ozone ($UV/O_3$) process, followed by water washing or $O_2$ plasma ashing to remove photoresist residues.

9. Back Surface Polishing and Edge Processing

The workpiece is finished by polishing the back surface, i.e., the exposed surface of the second metal layer 14, and stamped to have desired inner and outer perimeters.

In the finishing process, the patterned surface of the workpiece may be coated with resin for protection before polishing the back surface, but such a coating is not required when the back surface is polished prior to the separation of the master plate 10.

The above production process may be performed using a mother stamper or replica of the master plate 10 in place of the master plate 10. The replica may be prepared using a master stamper, which is a reverse replica of the master plate 10 obtained through a given production process. The mother stamper can be repeatedly used and allows each production cycle to be performed without involving fine patterning of the master plate, leading to a significant cost reduction in the manufacture of the thermal insulation stamper.

Figure 14:
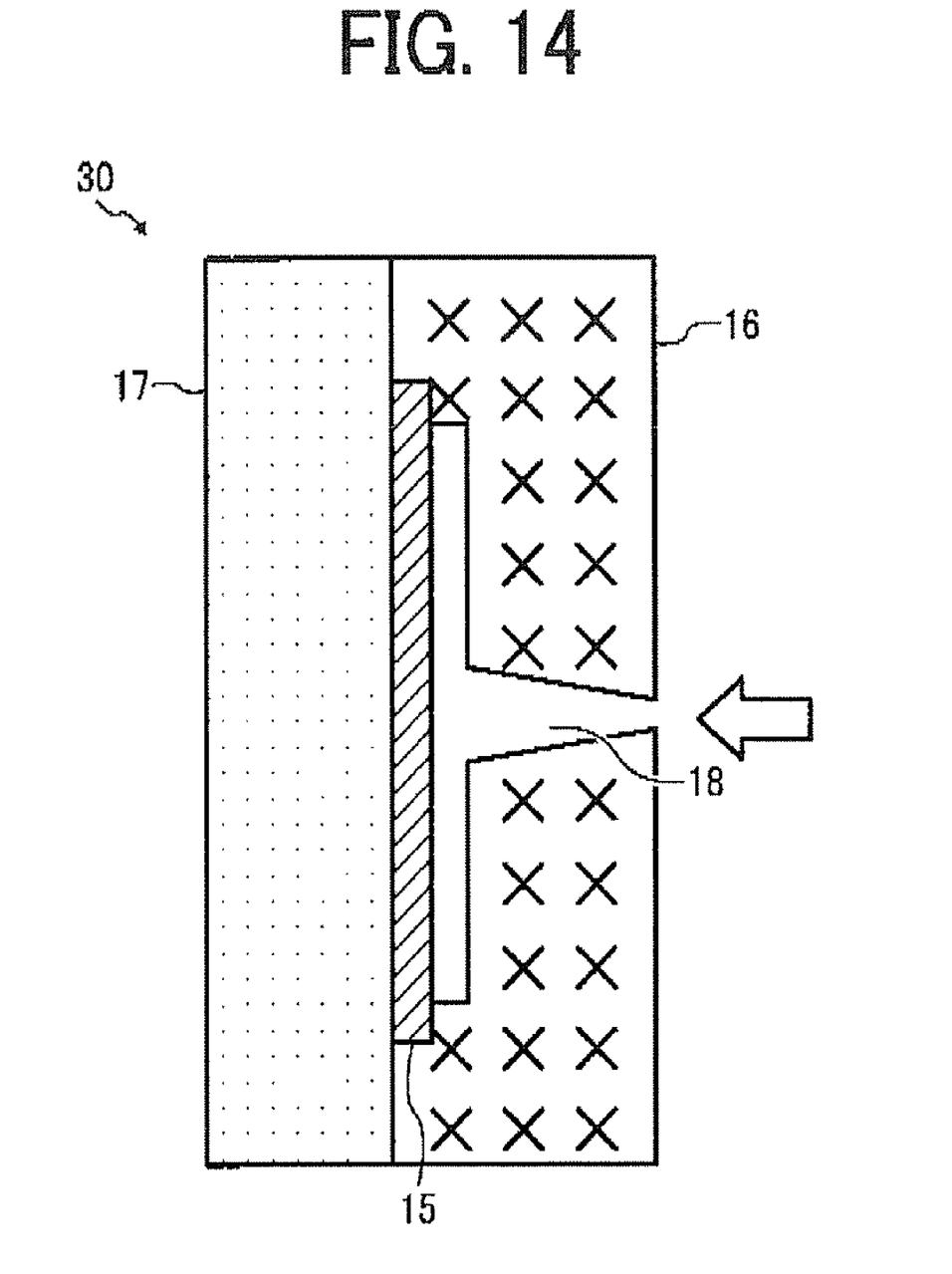
FIG. 14 is a schematic diagram illustrating the thermal insulation stamper in use in injection molding.

FIG. 14 is a schematic diagram illustrating injection molding with a thermal insulation stamper 15 obtained through the production method depicted in FIGS. 13A through 13F.

As shown in FIG. 14, the thermal insulation stamper 15 according to this patent specification is used in an injection mold 30 for an optical disk substrate. The injection mold 30 is formed of a pair of mold halves 16 and 17, one movable and the other fixed or stationary. The mold plates 16 and 17 are clamped together to define an interior mold cavity 18 in which the stamper 15 is held.

In use, molten plastic is injected into the mold cavity 18 and pressurized between the mold halves 16 and 17. After cooling and solidifying the injected material, the mold side 17 is retracted from the stationary side 18 and the resulting substrate removed.

Owing to the durability of the laminated structure, the thermal insulation stamper 15 according to this patent specification can withstand delamination even when subjected to repeated thermal cycles, particularly, those encountered in the manufacture of optical disk substrates.

The following describes one embodiment of the stamper production method according to this patent specification. However, it should be appreciated that the thermal insulation stamper and the stamper production method according to this patent specification are not limited to the specific embodiment described below.

EMBODIMENT

A master plate of glass for use in optical disk manufacturing was prepared using a known technique.

A conductive coating with a thickness of 10 nm was formed by sputtering nickel on a fine pattern of the master plate.

The nickel-coated master plate was then immersed in a nickel sulfamate bath for electroforming, through which an electroforming current was passed at a low density of 0.15 $A/dm^2$ for initial 5 minutes, then raised to a level of 15 $A/dm^2$, and maintained at this final level to obtain a first metal layer of nickel with a thickness of 30 μm.

Subsequently, a varnish prepared by dissolving a PAI VYLOMAX® (manufactured by TOYOBO Co., Ltd.) in NMP was deposited on the first metal layer, and spread thereover to a desired thickness by spin coating. The workpiece was then heated in an oven at 140° C. for 50 minutes to evaporate the solvent and moisture to obtain a heat insulating layer of PAI with a thickness of 50 μm.

Then, chromium was deposited by ion plating on the heat insulating layer to obtain an intermediate metal layer with a thickness of 20 nm. The deposition was performed under the following conditions: Ultimate vacuum of $5*10^{-5}$; argon leak pressure of $3*10^2$; and RF power of 85 W.

In succession to the chromium deposition, a similar deposition process was performed without exposing the workpiece to air so as to obtain a conductive coating of nickel with a thickness of 50 nm.

Thereafter, a second metal layer was formed of nickel on the conductive coating in a manner similar to that used to obtain the first metal layer. The multilayered structure thus obtained had a total thickness of 300 μm.

The workpiece was removed from the master plate. The surface of the first metal layer, to which the fine pattern was transferred from the master plate, was subjected to $UV/O_3$ process, followed by water washing to remove photoresist residues.

After cleaning, the patterned surface is coated with a protective resin film. Then, back surface polishing and stamping were sequentially performed to obtain a stamper with desired inner and outer perimeters.

The thermal insulation stamper thus produced was installed in an injection molding machine SD40E (manufactured by Sumitomo Heavy Industries, Ltd.), and injection molding was performed to produce polycarbonate optical disk substrates.

After more than 500,000 shots of injection molding, the thermal insulation stamper according to this patent specification did not develop delamination at inner and/or outer edges and maintained good molding quality. Such durability is excellent compared to that of a conventional heat insulation stamper, which would delaminate after a little over 100,000 shots of injection molding.

Numerous additional modifications and variations of the present disclosure are possible in light of the above teachings. It is therefore to be understood that, within the scope of the appended claims, the disclosure of this patent specification may be practiced otherwise than as specifically described herein.

What is claimed as new and desired to be protected by Letters Patent of the United States is:

1. A thermal insulation stamper, comprising:
   a first metal layer having a fine pattern on an exposed surface;
   a heat insulating layer formed of a heat-resistant resin and overlying the first metal layer, the heat-resistant resin containing oxygen;
   an intermediate layer formed of an oxygen-active metal and overlying the heat insulating layer;
   a conductive coating overlying a top surface of the intermediate layer; and
   a second metal layer overlying the conductive coating,
   wherein the intermediate layer is a vapor deposited layer that is deposited through plasma treatment and which during deposition activates oxygen contained in the heat insulating layer to form an interfacial region between the heat insulating layer and the intermediate layer where the oxygen establishes a chemical bond with the oxygen-active metal, and
   wherein a concentration of oxygen decreases from the top surface of the intermediate layer toward the heat insulating layer, and increases within the interfacial region from the intermediate layer to the heat insulating layer.

2. The thermal insulation stamper according to claim 1, wherein the intermediate layer is formed of one of chromium and titanium.

3. The thermal insulation stamper according to claim 1, wherein the heat-resistant resin is polyamideimide.

4. The thermal insulation stamper according to claim 1, wherein the stamper is usable in injection molding of an optical disk substrate with the fine pattern being one of a spiral pattern and a concentric pattern.

* * * * *